United States Patent
Han et al.

(10) Patent No.: US 9,092,904 B2
(45) Date of Patent: Jul. 28, 2015

(54) MULTI VIEW IMAGE PROCESSING APPARATUS AND IMAGE PROCESSING METHOD THEREOF

(71) Applicant: SAMSUNG ELECTRONICS CO., LTD., Suwon-si (KR)

(72) Inventors: Seung-ryong Han, Jeonju-si (KR); Ho-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/269,365

(22) Filed: May 5, 2014

(65) Prior Publication Data

US 2015/0029179 A1 Jan. 29, 2015

Related U.S. Application Data

(60) Provisional application No. 61/858,810, filed on Jul. 26, 2013.

(30) Foreign Application Priority Data

Nov. 13, 2013 (KR) .......... 10-2013-0137519

(51) Int. Cl.
*G06T 19/20* (2011.01)
*G06F 3/0481* (2013.01)
*G06F 3/0484* (2013.01)

(52) U.S. Cl.
CPC ............ *G06T 19/20* (2013.01); *G06F 3/04815* (2013.01); *G06F 3/04847* (2013.01)

(58) Field of Classification Search
CPC .......................... H04N 13/00; H04N 2213/005
See application file for complete search history.

(56) References Cited

U.S. PATENT DOCUMENTS

| | | | | |
|---|---|---|---|---|
| 2011/0102321 | A1* | 5/2011 | Son ................................ | 345/158 |
| 2011/0119709 | A1* | 5/2011 | Kim et al. ...................... | 725/39 |
| 2011/0242296 | A1 | 10/2011 | Ishihara et al. | |
| 2011/0296327 | A1 | 12/2011 | Kang et al. | |
| 2012/0044241 | A1 | 2/2012 | Chen et al. | |
| 2012/0044242 | A1 | 2/2012 | Kwon et al. | |

OTHER PUBLICATIONS

Vetro, A., Tourapis, A., Muller, K., Chen, T., 3D-TV Content Storage and Transmission, Jun. 2001, IEEE Transactions on Broadcasting, vol. 57, No. 2, pp. 384-394.*
Search Report dated Nov. 18, 2014, Issued by the International Searching Authority in counterpart International Application No. PCT/KR2014/006729.
Written Opinion dated Nov. 18, 2014, Issued by the International Searching Authority in counterpart International Application No. PCT/KR2014/006729.

* cited by examiner

*Primary Examiner* — Said Broome
(74) *Attorney, Agent, or Firm* — Sughrue Mion, PLLC

(57) ABSTRACT

A multi view image display apparatus is disclosed. A multi view image processing apparatus includes a depth extractor which is configured to extract depth information of a three-dimensional (3D) input image, a depth corrector which is configured to correct a depth of an on screen display (OSD) region in the 3D input image based on the extracted depth information and OSD mask information which corresponds to the OSD region in the 3D input image, and a rendering device which is configured to render multi view images using the 3D input image with the corrected depth.

12 Claims, 16 Drawing Sheets

FIG. 4B

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 1 | 1 | 1 | 0 |
| 0 | 0 | 0 | 0 | 0 | 0 | 0 | 1 | 1 | 1 | 0 |
| 0 | 0 | 0 | 0 | 0 | 0 | 0 | 0 | 0 | 0 |

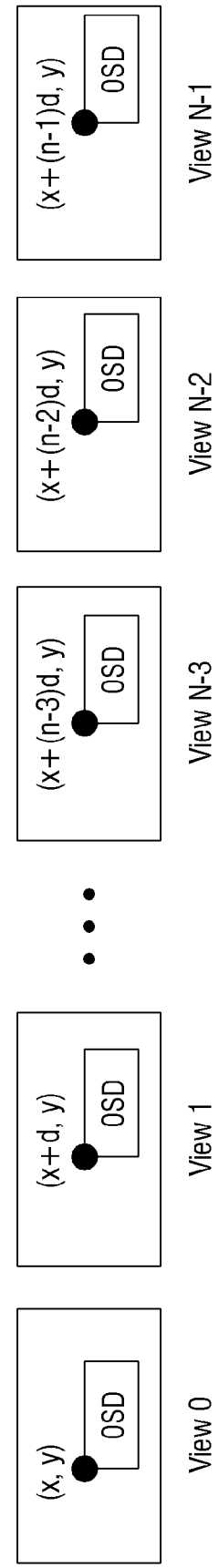

MULTI VIEW IMAGE PROCESSING APPARATUS AND IMAGE PROCESSING METHOD THEREOF

CROSS-REFERENCE TO RELATED APPLICATIONS

This application claims priority from U.S. Provisional Patent Application No. 61/858,810, filed on Jul. 26, 2013, in the United States Patent and Trademark Office, and Korean Patent Application No. 10-2013-0137519, filed on Nov. 13, 2013, in the Korean Intellectual Property Office, the entire disclosure of which is hereby incorporated by reference in its entirety.

BACKGROUND

1. Field

Apparatuses and methods consistent with the exemplary embodiments relate to a multi view image processing apparatus and an image processing method thereof. In particular, exemplary embodiments relate to a non-glass type multi view image processing apparatus and an image processing method thereof.

2. Description of the Related Art

With the development of electronic technologies, various types of electronic devices have been developed and distributed. In particular, a display apparatus such as a television (TV), which is one of the most common home electronic devices, has been rapidly developing in recent years.

As performance of a display device has increased, the types of contents displayed by the display device have diversified. In particular, in a related art, a stereoscopic display system for viewing three-dimensional (3D) content has been developed and distributed.

A related art stereoscopic display device may be embodied as various types of display devices such as various monitors, a cellular phone, a personal digital assistant (PDA), a personal computer (PC), a set top PC, a tablet PC, an electronic frame, a kiosk, etc. The related art stereoscopic device may also be embodied as a 3D TV in a home. Further, 3D display technologies may be used in various fields requiring 3D imaging, such as science, medicine, design, education, advertisement, computer game, etc., as well as at home.

A related art stereoscopic display system may be largely categorized into a non-glass type system by which an image is viewable without glasses and a glass type system by which an image is viewable with glasses.

Although a glass type system of the related art provides a satisfactory stereoscopic effect, a user must go through the inconvenience of wearing glasses. In a non-glass type system of the related art, the user may view a 3D image without glasses. Therefore, development of the non-glass type system has increased.

A related art non-glass type system displays multi view images, for example, N-view images to a viewer. Thus, N multi view images are required. The N multi view images are acquired by a camera. However, in case of N>2, it is difficult to acquire the N multi view images in a system implementation.

Accordingly, the related art non-glass type system extracts depth information and then renders multi view images when a stereoscopic image is input. However, when the input stereoscopic image contains on screen display (OSD) information, it is difficult to accurate depth information from an OSD region during extraction of the depth information. Thus, an error arises in the depth information of the OSD region. Thus, a displayed OSD image is distorted.

SUMMARY

Exemplary embodiments may overcome the above disadvantages and other disadvantages not described above. Also, the exemplary embodiments are not required to overcome the disadvantages described above. Further, an exemplary embodiment may not overcome any of the problems described above.

The exemplary embodiments may provide a multi view image processing apparatus and an image processing method thereof, which corrects a depth in an on screen display (OSD) region in a three-dimensional (3D) image. Thus, image distortion is prevented.

According to an aspect of an exemplary embodiment, a multi view image processing apparatus includes a depth extractor which is configured to extract depth information of a three-dimensional (3D) input image, a depth corrector which is configured to correct a depth of an on screen display (OSD) region in the 3D input image based on the extracted depth information and OSD mask information which corresponds to the OSD region in the 3D input image, and a rendering device which is configured to render multi view images using the 3D input image with the corrected depth.

The depth extractor may be further configured to generate a depth map based on the extracted depth information and the depth corrector may be further configured to correct a depth value of the OSD region in the depth map.

The depth corrector may be further configured to correct a depth value of the OSD region to a first depth value in the depth map.

The depth corrector may be further configured to correct a plurality of depth values of remaining regions except for the OSD region to a second depth value in the depth map.

The depth corrector may be further configured to correct the depth value of an entire region in the OSD region to 0 in the depth map.

The multi view image processing apparatus may further include a display device which is configured to display the 3D input image including a plurality of OSD regions, a user interface device which is configured to receive a user command, and a controller which is configured to control the depth corrector to correct a depth of at least one selected OSD region differently according to the user command from a plurality of depths of remaining OSD regions except the at least one selected OSD region in the 3D image.

The controller may be further configured to control the depth corrector to correct the depth of the at least one selected OSD region to a preset third depth value, and to correct the plurality of depths of the remaining OSD regions except the at least one selected OSD region to 0.

According to another aspect of an exemplary embodiment, a method of processing multi view images includes extracting depth information of a three-dimensional (3D) input image, correcting a depth of an on screen display (OSD) region in the 3D input image based on the extracted depth information and OSD mask information which corresponds to the OSD region in the 3D input image, and rendering multi view images using the 3D input image with the corrected depth.

The extracting the depth information may include generating a depth map based on the extracted depth information, and the correcting the depth may include correcting a depth value of the OSD region in the depth map.

The correcting the depth may include correcting the depth value of the OSD region to a first depth value in the depth map.

The correcting the depth may include correcting a plurality of depth values of remaining regions except for the OSD region to a second depth value in the depth map.

The correcting the depth may include correcting the depth value of an entire region in the OSD region to 0 in the depth map.

The method may further include displaying the 3D input image containing a plurality of OSD regions, receiving a user command for selecting at least one of the plurality of OSD regions, and correcting a depth of the at least one selected OSD region differently according to the user command from a plurality of depths of remaining OSD regions except the at least one selected OSD region.

The correcting the depth may include correcting the depth of the at least one selected OSD region to a preset third depth value, and correcting the plurality of depths of the remaining OSD regions except the at least one selected OSD region to 0.

According to yet another aspect of an exemplary embodiment, a method of processing multi view images includes displaying a 3D input image comprising at least one content region, applying a first depth value to the at least one content region, and applying a second depth value to the 3D input image except the at least one content region. The first depth value is different from the second depth value.

As described above, according to various embodiments, a non-glass type 3D system may prevent image distortion in an OSD region in a 3D image.

In addition, according to various embodiments, the non-glass type 3D system may perform a partial 3D function.

Additional and/or other aspects and advantages of the exemplary embodiments will be set forth in part in the description which follows and, in part, will be obvious from the description, or may be learned by practice of the exemplary embodiments.

BRIEF DESCRIPTION OF THE DRAWING FIGURES

The above and/or other aspects of the exemplary embodiments will be more apparent by describing certain exemplary embodiments with reference to the accompanying drawings, in which:

FIGS. 4A and 4B are diagrams for explanation of on screen display (OSD) mask information according to an embodiment;

FIG. 6 is a diagram for explanation of a depth correcting method according to another embodiment;

DETAILED DESCRIPTION OF THE EXEMPLARY EMBODIMENTS

Certain exemplary embodiments will now be described in greater detail with reference to the accompanying drawings.

Figure 1:
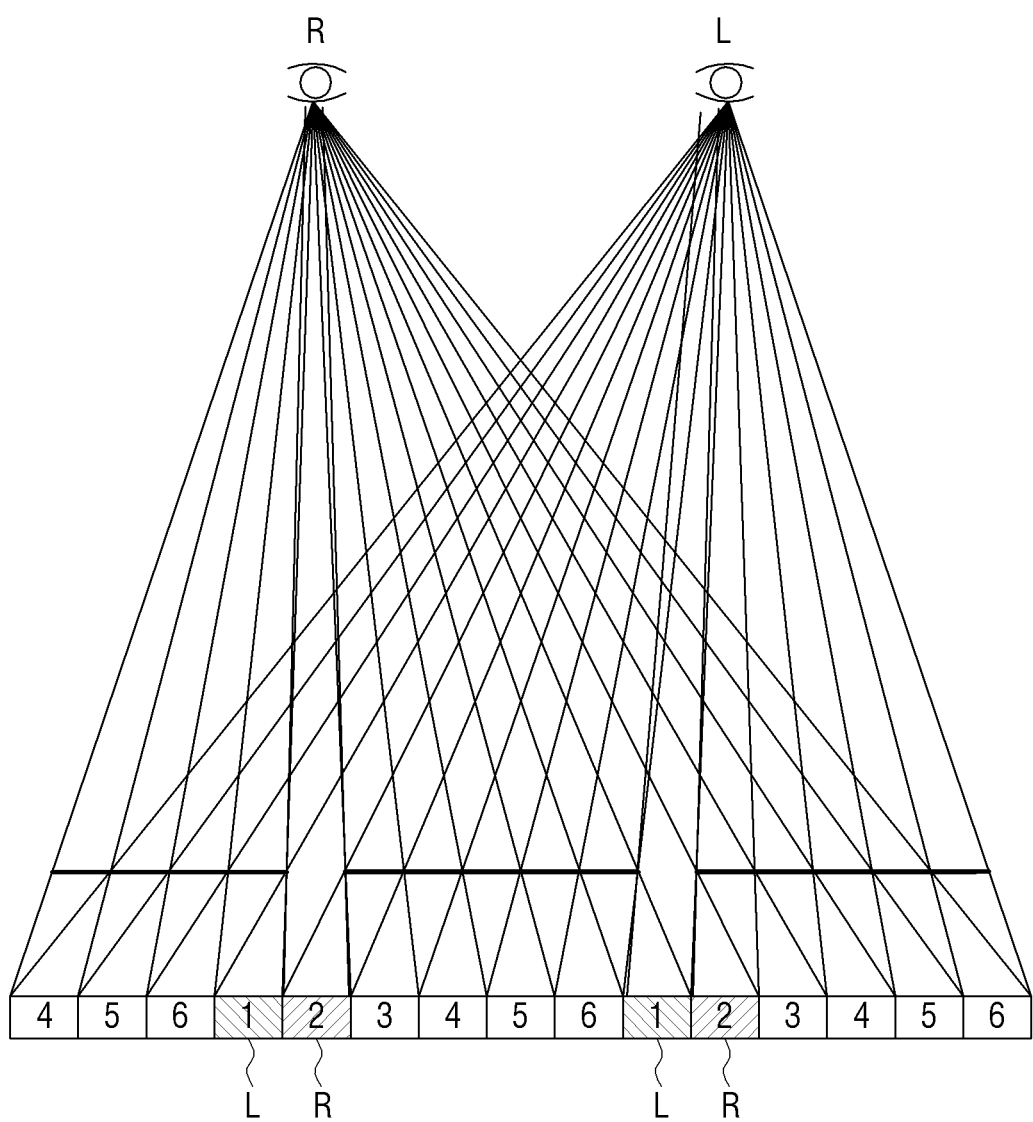
FIG. 1 is a diagram for explanation of an operation of a non-glass three-dimensional (3D) display apparatus.

FIG. 1 is a diagram for explanation of an operation of a non-glass three-dimensional (3D) display apparatus.

FIG. 1 illustrates an operation of an apparatus for displaying a multi view image and providing a stereoscopic image using a non-glass manner according to an embodiment. The multi view image includes a plurality of images obtained by capturing an object at different angles. In other words, the multi view image is obtained by refracting a plurality of images captured at different views, at different angles, and focusing the plural images at a predetermined distance, that is, a view distance (e.g., about 3 m). A location in which these images are formed is referred to as a viewing zone. Accordingly, when one eye of a user is located in a first viewing zone and the other eye is located in a second viewing zone, the user may experience a stereoscopic effect.

For example, FIG. 1 is a diagram of a displaying operation of multi view images (e.g., with 6 of views in total). Referring to FIG. 1, a non-glass 3D display apparatus allows light corresponding to a first view image of the 6 views to reach a left eye and light corresponding to a second view image of the 6 views to reach a right eye. Accordingly, the user may view different view images with left and right eyes to experience a stereoscopic effect.

Figure 2A:
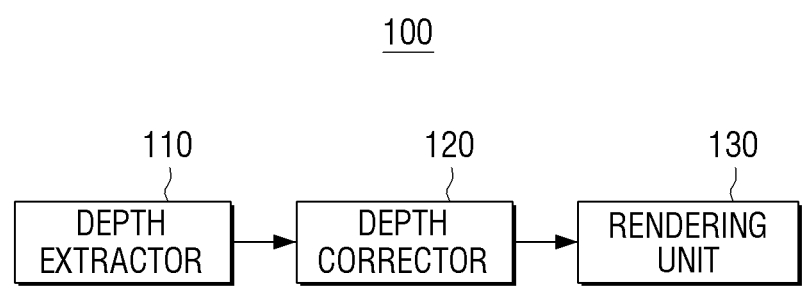
FIG. 2A is a block diagram illustrating the structure of a multi view image processing apparatus according to an embodiment.

FIG. 2A is a block diagram illustrating the structure of a multi view image processing apparatus 100 according to an embodiment.

Referring to FIG. 2A, the multi view image processing apparatus 100 includes a depth extractor 110, a depth corrector 120, a rendering unit 130, and a controller 140.

An image receiver (not shown) receives a 3D image signal. The 3D image may be a stereoscopic image. The stereoscopic image includes two images acquired by capturing one object at different angles, that is, a left eye image and a right eye image. The stereoscopic image may be provided from various sources. For example, the image receiver (not shown) may receive the stereoscopic image by wire or wirelessly from a source such as a broadcast channel. In this case, the image receiver (not shown) may include various components such as a tuner, a demodulator, an equalizer, and so on. In addition, the image receiver (not shown) may receive a stereoscopic image reproduced by a recording medium reproducing unit for reproducing various media such as a digital video disc (DVD), a blue ray disc, a memory card, and so on or may directly receive a stereoscopic image captured by a camera. In this case, the image receiver (not shown) may include various interfaces such as a universal serial bus (USB) interface and so on. The image receiver (not shown) may receive a stereoscopic image from an external server such as a web server. In addition, a 3D image may be generated based on a 2D image in a 2D-3D converting scheme, or may be a multi view image with 3 or more views. A detailed description thereof is omitted.

The depth extractor 110 extracts depth information about an object, present in an image, based on left and right eye images. The depth information indicates 3D distance information of the object, present in the image, and may be called a depth map or a depth image. For example, the depth information refers to information indicating a stereoscopic effect such as a distance between an object and a camera, a distance between the object and a recording medium on which an image of the object is imaged, and so on. In other words, as a distance between points corresponding to left and right eye images is increased, a stereoscopic effect is improved. The depth map may be configured by representing variation in depth as one image and represented as a gray level that varies depending on a distance between the points matched to each other in the left and right eye images. For example, a light area in the depth map indicates a short distance between a camera and an object, and a dark area in the depth map indicates a long distance between the camera and the object.

The depth extractor 110 may represent a depth value, from 0 to 255 per pixel of an image to indicate 3D distance information of the object, present in the image. For example, based on black/white, black (a low value) may indicate a long distance from a viewer and white (a high value) may indicate a short distance from the viewer.

The depth extractor 110 may perform a stereo matching operation of searching for matched points in the left and right eye images in order to generate the depth map. In some cases, the depth extractor 110 may apply an adaptive weight and perform the stereo matching operation.

For example, a left eye image and a right eye image are images obtained by photographing one object at different views, thereby generating an image difference due to the view difference. For example, an edge portion and a background portion may overlap each other in the left eye image, and may be slightly spaced apart from each other in the right eye image. Thus, the adaptive weight may be applied to increase a weight with respect to pixels with pixel values within a predetermined range based on the object, and to reduce a weight with respect to pixels with pixel values outside the predetermined range based on the object. Thus, after adaptive weights are applied to the left eye image and the right eye image, respectively, the results are compared with each other to determine whether points are matched. When the adaptive weights are used, appropriate matched points may be prevented from being determined as having a low correlation, thereby increasing matching accuracy.

Although not illustrated, the multi view image processing apparatus 100 may further include a downscaler (not shown) for reducing a computational burden as to generation of the depth map. In other words, the downscaler (not shown) may downscale an image received via an image receiver (not shown) and provide the image to the depth extractor 110, thereby reducing a computational burden.

However, when depth information is input together with an image, a function performed by the depth extractor 110 may be omitted.

The depth corrector 120 corrects a depth value of an on screen display (OSD) region based on OSD mask information corresponding to the OSD region contained in the 3D image and the depth information extracted by the depth extractor 110.

The depth corrector 120 may correct the depth value of the OSD region in the depth map generated by the depth extractor 110. In this case, the OSD region may be identified via OSD mask information. For example, the OSD mask may have a value "1" with respect to a pixel region corresponding to the OSD region and have a value "0" with respect to the remaining pixel region, but embodiments are not limited.

The depth corrector 120 may correct the depth value of the OSD region to a first depth value based on the extracted depth and OSD mask information. In other words, the depth corrector 120 may apply a uniform depth value so as to prevent a perspective of an object contained in the OSD region from being changed.

For example, the depth corrector 120 may set one of a greatest value, a smallest value, and an intermediate value of depth values of the OSD regions, extracted by the depth extractor 110, a depth value at a center or a boundary of the OSD region, a value input by a user, and a value determined as a default value (e.g., 0) as the first depth value, but the embodiments are not limited. For example, when the first depth value is set to 0, the OSD region may be positioned on a focal plane in which perspective is barely achieved.

As another example, the depth corrector 120 may set the first depth value without considering a depth value of a surrounding region. In other words, the depth corrector 120 may set a value similar to a depth value of a surrounding background image as a depth value so as to prevent the OSD region from being expressed as a foreign and a noncontiguous region to the surrounding background image. In other words, the depth corrector 120 may set a value most similar to the depth value of the surrounding background image as the depth value, among depth values of the OSD region.

In addition, the depth corrector 120 may correct the depth value of the remaining region except for the OSD region to a second depth value in the depth map based on the extracted depth and OSD mask information.

For example, the depth corrector 120 may set one of a greatest value, a smallest value, and an intermediate value of the depth values of the remaining region except for the OSD region, extracted by the depth extractor 110, a greatest depth value or average value of objects containing the background image, and a value determined as a default value (e.g., 0), but the embodiments are not limited thereto.

For example, the depth corrector 120 may set the second depth value in consideration of the depth value of the OSD region. For example, the depth corrector 120 may set the second depth value as a greater depth value than the depth value set for the OSD region.

In addition, the depth corrector 120 may correct a depth value of an entire region including the OSD region to 0 in the depth map. In other words, when the OSD region is present in the 3D image, the depth corrector 120 may apply the same depth as that of the 2D image to the OSD region and the remaining region to reduce crosstalk.

In addition, when a plurality of OSD regions is contained in one frame, the depth corrector 120 may set different depth values for the respective plurality of OSD regions or set a same depth value.

In order to reduce flicker on the OSD region (i.e., a depth of which is corrected), the depth corrector 120 may perform a depth temporal smoothing process. In other words, the depth corrector 120 may perform the smoothing process on non-uniform depth values in the OSD region (i.e., the depth of which is corrected), to remove text flicker due to depth variation or perform the smoothing process in order to remove distortion at a boundary of the OSD region due to a difference between the corrected depth value and the depth value of the background image.

The depth corrector 120 may perform the smoothing process on the OSD region (i.e., the depth value is corrected), via a smoothing filter such as a median filter, a weighted average filter, a maximum filter, etc.

The rendering unit 130 may render multi view images using a 2D image or a 3D image (or a multi view image), a depth of which is corrected by the depth corrector 120. The rendering unit 130 may render the multi view images based on the input 3D image or 2D image and the depth information input separately from the image, or render the multi view images based on the input 3D image and depth information extracted from the corresponding 3D image. The depth information may be information of a depth which is corrected by the depth corrector 120.

For example, the rendering unit 130 may select the 3D image, i.e., one of the left eye image and the right eye image as a reference view (or a center view) to generate a leftmost view and a rightmost view as references of the multi view images. In this case, the rendering unit 130 may generate the leftmost view and the rightmost view based on the corrected depth information corresponding to one of the left eye image and the right eye image, which is selected as the reference view.

When the leftmost view and the rightmost view are generated, the rendering unit 130 may generate a plurality of interpolation views between the center view and the leftmost view and generate a plurality of interpolation views between the center view and the rightmost view to render the multi view images. However, the embodiments are not limited. In another embodiment, it may be possible to generate an extrapolation view generated using an extrapolation scheme. When the multi view images are rendered based on the 2D image and the depth information, it may be possible to select the 2D image as the center view.

Prior to rendering the multi view images, the rendering unit 130 may perform a hole filling process on holes present in the leftmost view and the rightmost view to compensate for the leftmost view and the rightmost view.

In addition, the rendering unit 130 may copy a value of a pixel region corresponding to one of the leftmost view and the rightmost view, and apply the value to a hole region of each of the multi view images generated based on the center view, the leftmost view, and the rightmost view to inpaint the hole region. In this case, the hole filling process may be performed from a portion close to a background. For example, when 35 of multi view images in total are rendered, a value of a pixel region corresponding to a $35^{th}$ view as the rightmost view may be filled in hole regions present in $18^{th}$ to $34^{th}$ views between a $17^{th}$ view as the center view and a $35^{th}$ view as the rightmost view.

However, in some embodiments, the hole filling process may be performed on each of the multi view images based on an input image.

According to the aforementioned embodiments, although the depth of the OSD region is corrected based on the left eye image and the right eye image, this is an example. According to another embodiment, after the OSD region is detected in a 2D image, uniform depth values may be allocated to the OSD region to generate the left eye image and the right eye image.

Figure 2B:
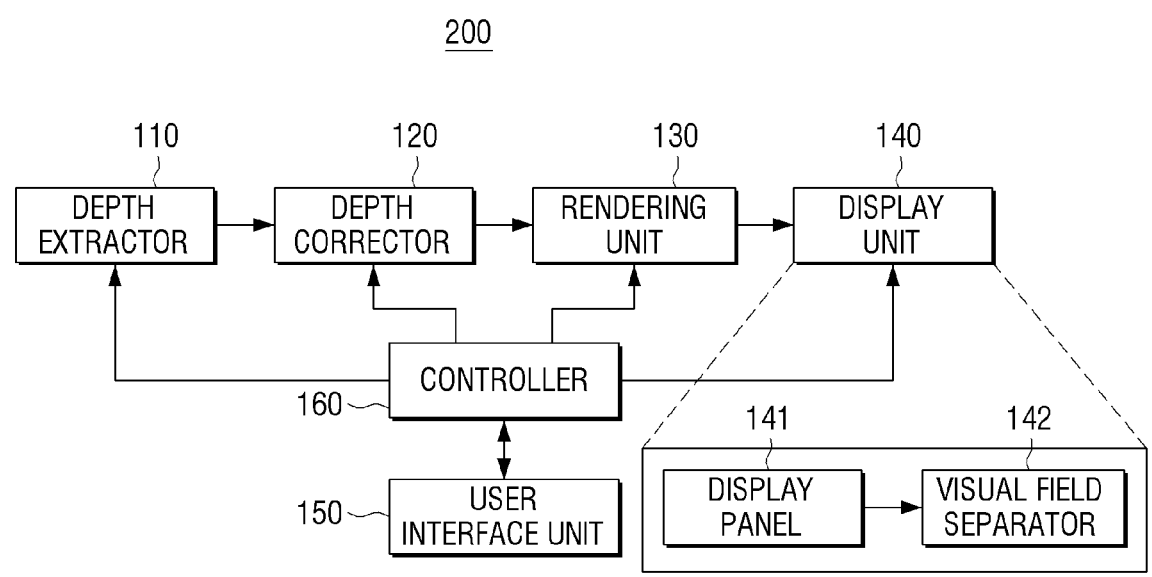
FIG. 2B is a block diagram illustrating the structure of a multi view image display apparatus according to an embodiment.

FIG. 2B is a block diagram illustrating the structure of a multi view image display apparatus 200 according to an embodiment.

Referring to FIG. 2B, the multi view image display apparatus 200 includes the depth extractor 110, the depth corrector 120, the rendering unit 130, a display unit 140, a user interface unit 150, and a controller 160. Among components illustrated in FIG. 2B, the depth extractor 110, the depth corrector 120, and the rendering unit 130 are the same as in FIG. 2A. Thus, detailed description thereof is omitted.

The display apparatus 200 of FIG. 2B may be embodied as various types of display devices such as a television (TV), a monitor, a personal computer (PC), a kiosk, a tablet PC, an electronic frame, a kiosk, a cellular phone, etc.

The display unit 140 provides multi views (or multi optical views). The display unit 140 includes a display panel 141 for providing multi views and a visual field separator 142.

The display panel 141 includes a plurality of pixels, and each of the pixels includes a plurality of sub pixels. Sub pixels may include a red (R) sub pixel, a green (G) sub pixel, and a blue (B) sub pixel. In other words, pixels including R, G, and B sub pixels may be arranged in a plurality of rows and columns to constitute the display panel 141. In this case, the display panel 141 may be embodied as various display units such as a liquid crystal display (LCD) panel, a plasma display panel (PDP), an organic light emitting diode (OLED), vacuum fluorescent display (VFD), field emission display (FED), electro luminescence display (ELD), etc.

The display panel 141 displays an image frame. The display panel 141 may display an image frame in which a plurality of images with different views is sequentially and repeatedly arranged.

In particular, the display panel 141 may display an image frame including a plurality of OSD regions. The plural OSD regions may be interpreted as having a plurality of OSD windows.

Although not illustrated in FIG. 2B, when the display panel 141 is embodied as an LCD panel, the display apparatus 200 may further include a backlight unit (not shown) for supplying backlight to the display panel 141 and a panel driver (not shown) for driving pixels of the display panel 141 according to pixel values of pixels constituting the image frame. Accordingly, when light generated from the backlight unit (not shown) is incident on each pixel of the display panel 141, the display panel 141 may adjust transmittance with respect to the light incident on each pixel according to an image signal and display the image frame. The display panel 141 includes a liquid crystal layer and two electrodes formed on opposite surface of the liquid crystal layer. When a voltage is applied to the two electrodes, an electromagnetic field is generated to move molecules of the liquid crystal layer between the two electrodes to adjust the transmittance of light.

The visual field separator 142 may be disposed on a front surface of the display panel 141 to provide different views, i.e., multi views according to a viewing zone. In this case, the visual field separator 142 may be embodied as a lenticular lens or a parallax barrier.

For example, the visual field separator 142 may be embodied as a lenticular lens including a plurality of lens regions. Thus, the lenticular lens may refract an image displayed on the display panel 141 via the plural lens regions. Each lens region may be formed with a size to correspond to at least one pixel and differently disperse light transmitted through each pixel according to a viewing zone.

As another example, the visual field separator 142 may be embodied as a parallax barrier. The parallax barrier may be embodied as a transparent slit array including a plurality of barrier regions. Accordingly, light is interrupted via a slit between barrier regions so as to capture images with different views according to a viewing zone.

During an operation, the visual field separator 142 may be inclined at a predetermined angle in order to improve image quality. The controller 160 may divide an image frame of images captured at a plurality of views based on the angle at which the visual field separator 142 is inclined and combine the divided images to generate an image frame. Accordingly, a user may view the display images at a predetermined inclination with respect to sub pixels, instead of images displayed in a vertical or horizontal direction to the sub pixels of the display panel 141.

Figure 3:
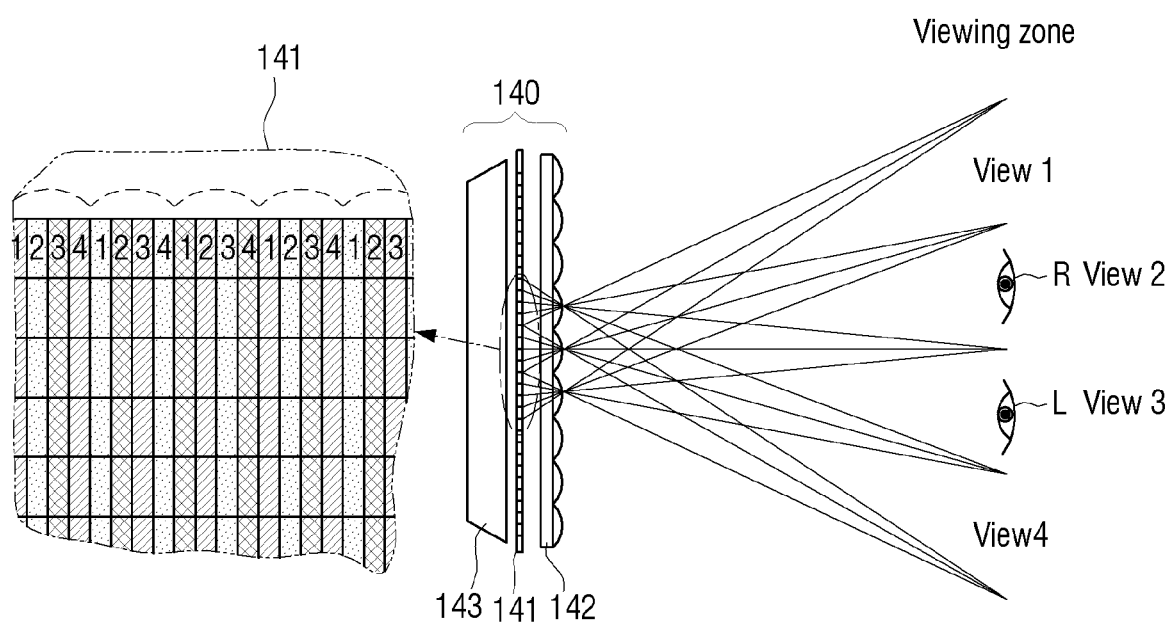
FIG. 3 is a diagram for explanation of an exemplary display unit according to an embodiment.

FIG. 3 is a diagram for explanation of an exemplary display unit 140 according to an embodiment.

Referring to FIG. 3, the display unit 140 includes the display panel 141, the visual field separator 142, and a backlight unit 143.

FIG. 3 illustrates an example in which the visual field separator 142 is embodied as a lenticular lens array.

Referring to FIG. 3, the display panel 141 includes a plurality of pixels defined by a plurality of columns. Images with different views are arranged in respective columns. FIG. 3 illustrates an example in which a plurality of images 1, 2, 3, and 4 with different views are sequentially and repeatedly arranged. In other words, pixel columns are arranged as groups indexed by 1, 2, 3, and 4. Graphic signals are arranged such that a pixel column 1 displays a first image and a pixel column 2 displays a second image.

The backlight unit 143 supplies light to the display panel 141. By virtue of the light supplied from the backlight unit 143, the images 1, 2, 3, and 4 formed on the display panel 141 are transmitted through the visual field separator 142, and the visual field separator 142 disperses the light of the images 1, 2, 3, and 4 and transmits the light to a viewer. In other words, the visual field separator 142 generates exit pupils at a viewer location, i.e., a viewing distance. As illustrated in FIG. 3, the thickness and diameter of the lenticular lens when the visual field separator 142 is embodied as a lenticular lens array, and an interval between slits when the visual field separator 142 is embodied as a parallax barrier may be designed so as to separate the exit pupils generated in respective columns at an average binocular center distance less than 65 mm. The separated image light beams form respective viewing zones. In other words, as illustrated in FIG. 3, when first to fourth views are generated and a left eye and a right eye of the user are positioned in the second view and the third view, respectively, the user may view a 3D image.

The user interface unit 150 receives various user commands.

In particular, the user interface unit 150 may receive a user command for selecting at least one OSD region, among a plurality of OSD regions contained in the displayed 3D image.

A graphic user interface (GUI) such as a cursor, a highlight, etc., for selecting at least one OSD region, among the plural OSD regions, may be displayed together with a plurality of OSD regions, and at least one OSD region may be selected, among the plural OSD regions, according to a user command for moving a location of the corresponding GUI.

The user interface unit 150 may be embodied as various forms according to implementation of the display apparatus 100. When the display apparatus 100 is embodied as a digital TV, the user interface unit 150 may be embodied as a remote control receiver for receiving a remote control signal from a remote controller 200, a camera for detecting a user motion, a microphone for receiving user voice, and so on.

The controller 160 controls an overall operation of the display apparatus 200.

The controller 160 may allow focused content to have a different depth value from the other contents, among a plurality of contents in a displayed image. The depth value may have a negative (−) depth value by which the focused content looks far, as well as a positive (+) depth value by which the focused content looks close.

For example, the controller 160 may control the depth corrector 120 to differently correct a depth of the OSD region selected according to the user command from depths of the other OSD regions, among the plural OSD regions contained in the 3D image.

In other words, the controller 160 may reset a depth value of the OSD region selected according to the user command, among the plurality of OSD regions, such that the selected OSD region has a different depth from that of the other OSD regions. In some embodiments, depths values of the other OSD regions may be reset.

The controller 160 may control the depth corrector 120 to the depth of the selected OSD region to a third preset value and to correct the depths of the other OSD regions to 0. The third depth value may be set to a value except for 0. A method of setting the third depth value is the same as the aforementioned method of setting the first depth value. Thus, a detailed description thereof is omitted.

Alternatively, the controller 160 may control the depth corrector 120 to correct the selected OSD region to the third depth value and to correct the depths of the other OSD regions to a fourth depth value. The fourth depth value may be smaller than the third depth value.

In addition, the controller 160 may control the depth corrector 120 to sequentially change depth values of the corresponding OSD regions so as to sequentially strengthen a highlight effect. For example, when a depth value of the corresponding OSD region is changed to 0 from −4, the controller 160 may respectively apply highlights at depth values −3, −2, and −1 so as to gradually strengthen a highlight effect from −4 to 0.

Thus, distortion of the OSD region is reduced and simultaneously, the user may experience a stereoscopic effect with respect to only the selected OSD region. Therefore, discrimination of the selected OSD region is improved. In addition, a focusing effect may be achieved by simply adjusting a view difference between left and right eye images of the corresponding content. Thus, the focusing effect may be achieved without a separate image processing process (e.g., highlight, scaling, texture, perspective effect processing, etc.).

According to the aforementioned embodiments, an example of the focused content is an OSD region. However, the content may be various forms such as a menu image, a warning, a character or figure such as time or channel number, application, and so on. For example, when a plurality of icons respectively indicating a plurality of applications is displayed, at least one depth value of an icon is selected to look far or close and the other icons.

Figure 4A:
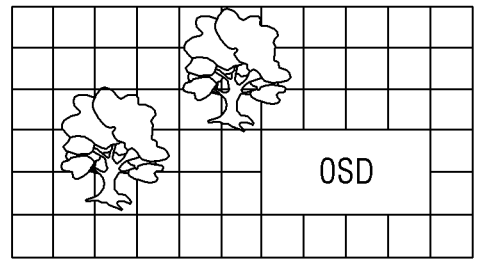

FIGS. 4A and 4B are diagrams for explanation of OSD mask information according to an embodiment.

As illustrated in FIG. 4A, when an OSD region is contained in a stereoscopic image or a multi view image, the OSD region is identified using an OSD mask (as illustrated in FIG. 4B).

The OSD mask information may be input together with left and right eye images containing the OSD region. However, when the corresponding information is not present, OSD mask information may be calculated based on the OSD information. For example, a mask corresponding to the OSD region may be generated by detecting the OSD region and extending and filtering a mask based on the detected OSD region.

According to an embodiment, the OSD mask information may be set to 1 for OSD regions and 0 for the other regions (as illustrated in FIG. 4B). However, embodiments are not limited. In other words, any information for identifying the OSD region may be used.

Figure 5A:
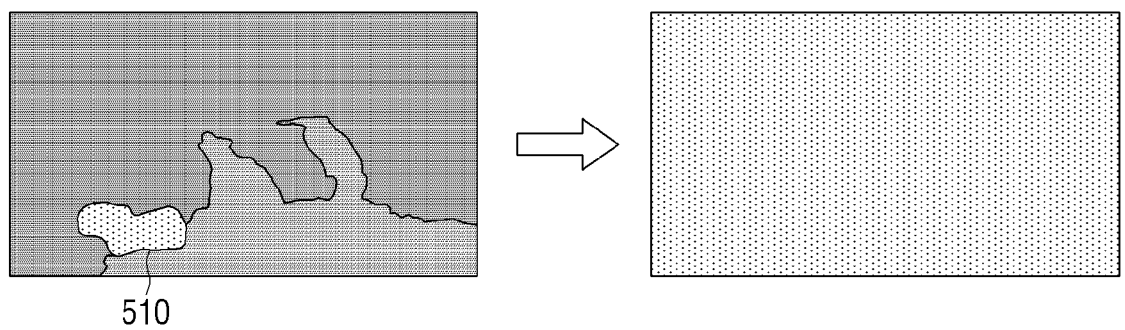
FIGS. 5A to 5C are diagrams for explanation of depth correcting methods according to various embodiments.
Figure 5B:
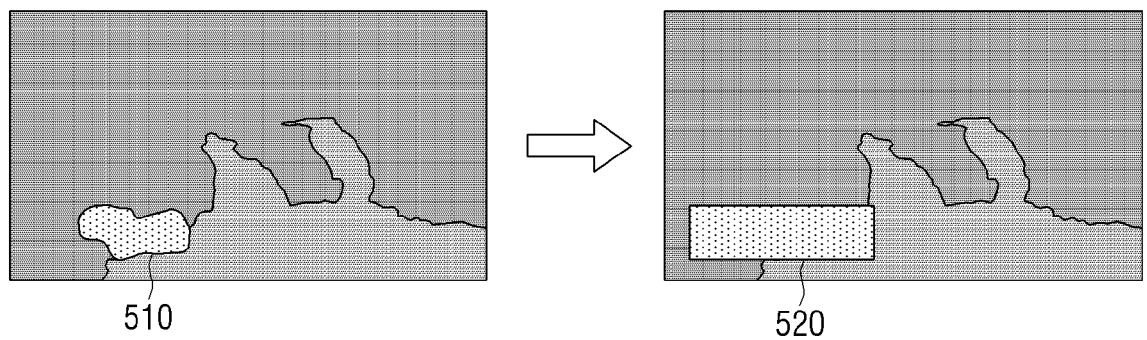
Figure 5C:
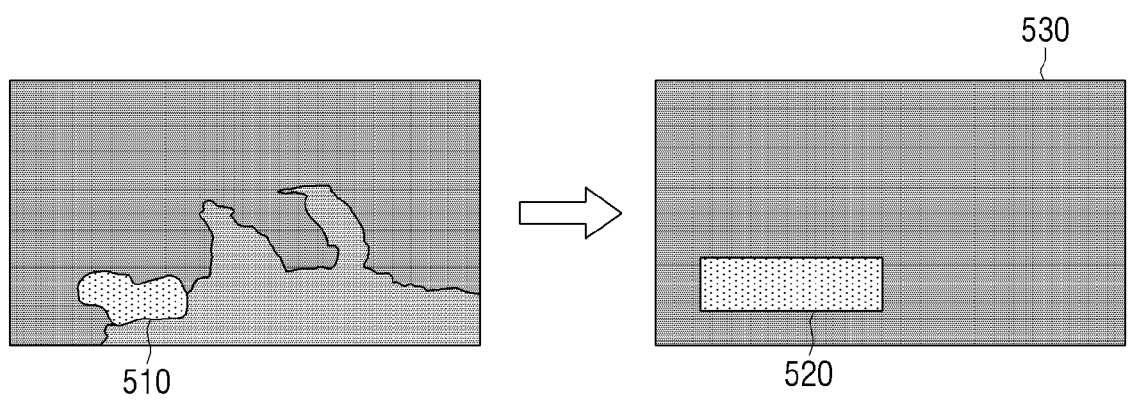

FIGS. 5A to 5C are diagrams for explanation of depth correcting methods according to various embodiments.

According to an embodiment illustrated in FIG. 5A, when OSD information 510 is input in a 3D view mode, while the 3D viewing mode is maintained, extracted depth information may be disregarded, disparity 0 may be applied to all depth information, and a multi view may be rendered using an image (i.e., a depth of which is corrected). Accordingly, a 3D stereoscopic effect of the OSD region may be removed, thereby preventing image distortion of the OSD region.

According to another embodiment illustrated in FIG. 5B, when the OSD information 510 is input in a 3D viewing mode, while the 3D viewing mode is maintained, a same depth value may be applied to an OSD region 520 identified based on OSD mask information, that is, the OSD region may be set to have uniform depths, and a multi view may be rendered using an image (i.e., a depth of which is corrected). Here, the depth value applied to the OSD region 520 may be set to a default value including 0, a greatest value among depth values calculated with respect to a text region, a greater depth value than a greatest depth value or an average value of objects contained in a background image by as much as a predetermined value, a depth value at a center or boundary of the OSD region, a value input by a user, and so on. However, the depth value applied to the OSD region 520 is not limited thereto.

Accordingly, the 3D stereoscopic effect with respect to the OSD region may be controlled to prevent image distortion of the OSD region.

According to another embodiment, when the OSD information 510 is input in a 3D viewing mode, while the 3D viewing mode is maintained, the same depth value may be applied to an OSD region 520 identified based on OSD mask information, a different depth value from the depth value applied to the OSD region 520 may be applied to the other region 530. Then, as illustrated in FIG. 5C, a multi view may be rendered using an image (i.e., a depth of which is corrected). Accordingly, image distortion of the OSD region may be prevented and simultaneously, a stereoscopic effect with respect to the OSD region may be achieved.

FIG. 6 is a diagram for explanation of a depth correcting method according to another embodiment.

As illustrated in FIG. 6, multi view images may be rendered. Then, an OSD region may be overlaid on the rendered image, instead of rendering the multi view images after correcting a depth of the OSD region (as in FIGS. 5A to 5C). As illustrated in FIG. 6, disparity corresponding to a randomly defined view difference may be applied to each multi view image and the OSD region may be overlaid on the multi view images. In other words, as illustrated in FIG. 6, disparity corresponding to d may be additionally added to the OSD region on N multi view images and the OSD region may be overlaid on the multi view images. Here, d may be a random real number. For example, d may be set to an appropriate value based on a greatest value or average value of objects contained in a background image, a depth value at a center or boundary of the OSD region, a value input by a user, and so on.

Figure 7A:
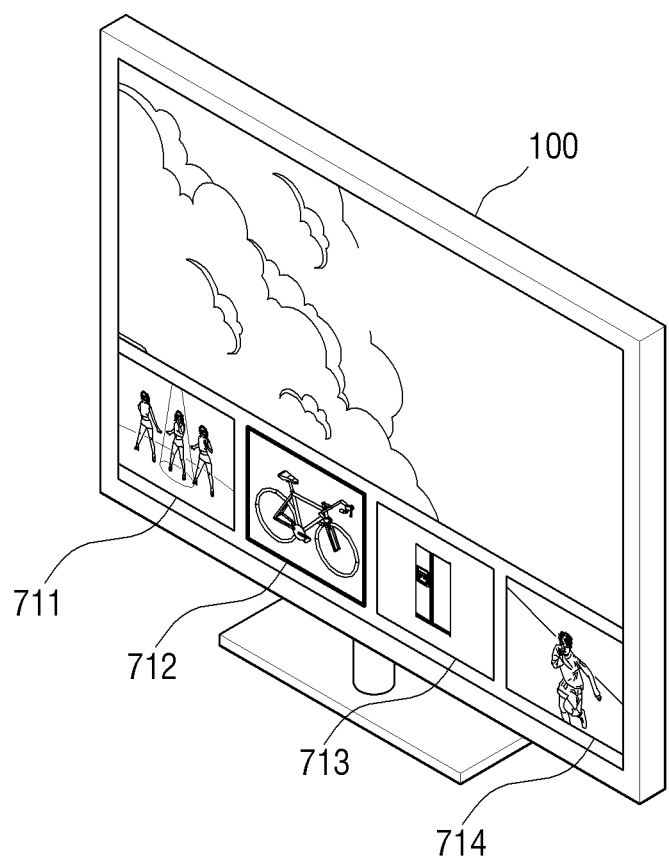
FIGS. 7A and 7B are diagrams for explanation of a depth correcting method according to another embodiment.
Figure 7B:
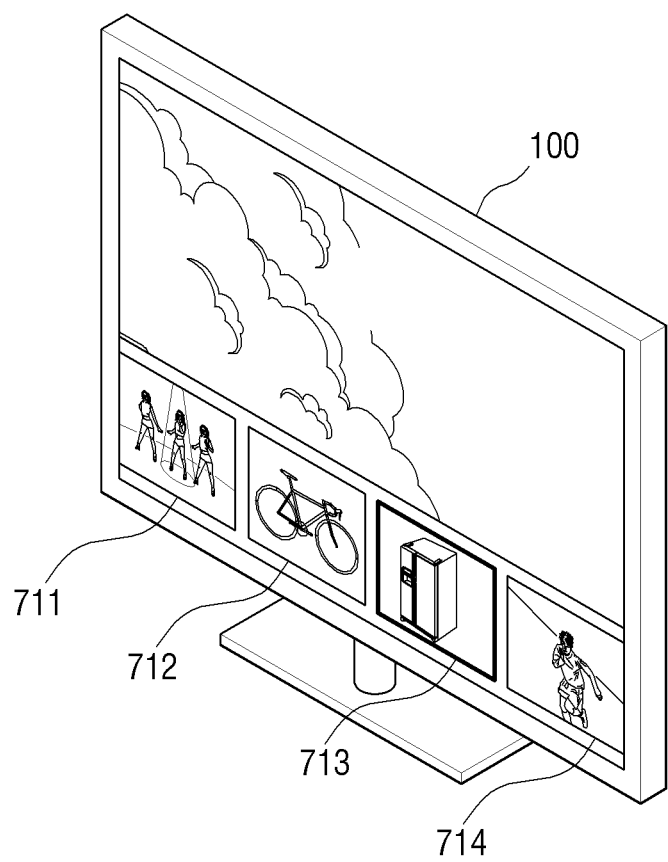

FIGS. 7A and 7B are diagrams for explanation of a depth correcting method according to another embodiment.

As illustrated in FIGS. 7A and 7B, when a plurality of OSD regions 711 to 714 is contained in a 3D image, a depth of the 3D may be corrected to apply a different depth value from different OSD regions to an OSD region selected by a user.

For example, as illustrated in FIG. 7A, when a plurality of OSD regions is contained in a 3D image, a preset depth value (except for 0) may be applied to an OSD region 712 selected by the user, among the OSD regions 711 to 714, and a depth value 0 may be applied to the remaining OSD regions and the background image such that the user may not experience a stereoscopic effect.

Then, as illustrated in FIG. 7B, when another OSD region 713 is selected by the user, a preset depth value (except for 0) may be applied to the corresponding OSD region 713 and a depth value 0 may be applied to the remaining OSD regions and the background image such that the user may not experience a stereoscopic effect.

However, the aforementioned embodiment is an example. According to another embodiment, a specific depth value may be applied to the selected OSD region and a smaller depth value than the depth value applied to the selected OSD region may be applied to the remaining OSD regions and the background image so as to show a relatively strengthened stereoscopic effect with respect to the selected OSD region.

According to another embodiment, a specific depth value may be applied to the selected OSD region, a smaller depth value than the depth value applied to the selected OSD region may be applied to the remaining OSD regions, and a smaller depth value than the depth value applied to the remaining OSD regions may be applied to the background image.

Figure 8A:
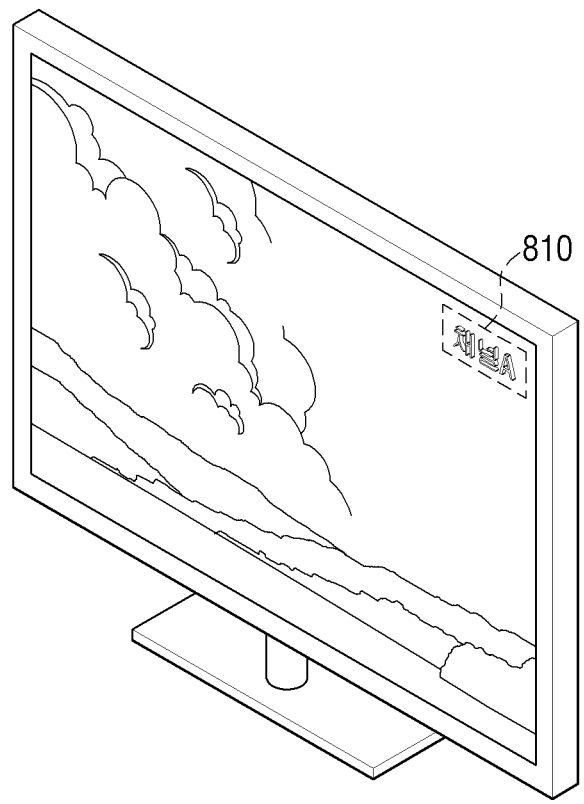
FIGS. 8A to 8C are diagrams for explanation of a depth correcting method according to another embodiment.
Figure 8B:
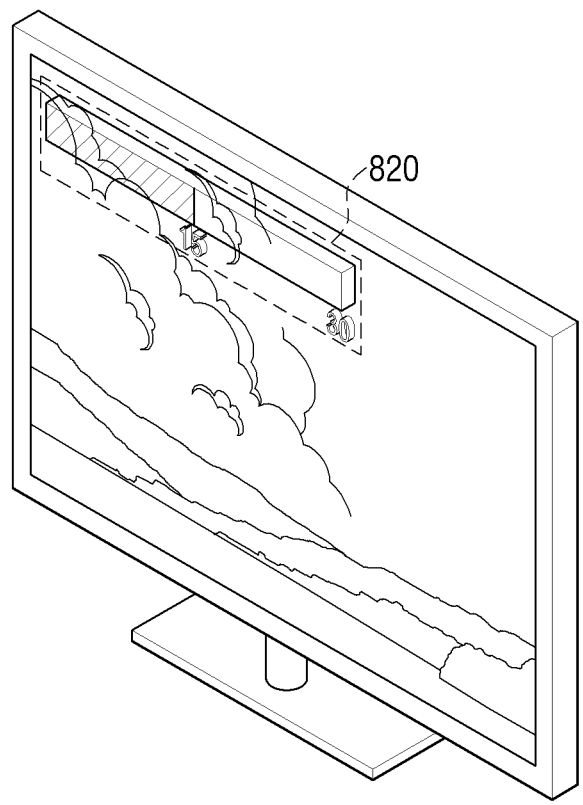
Figure 8C:
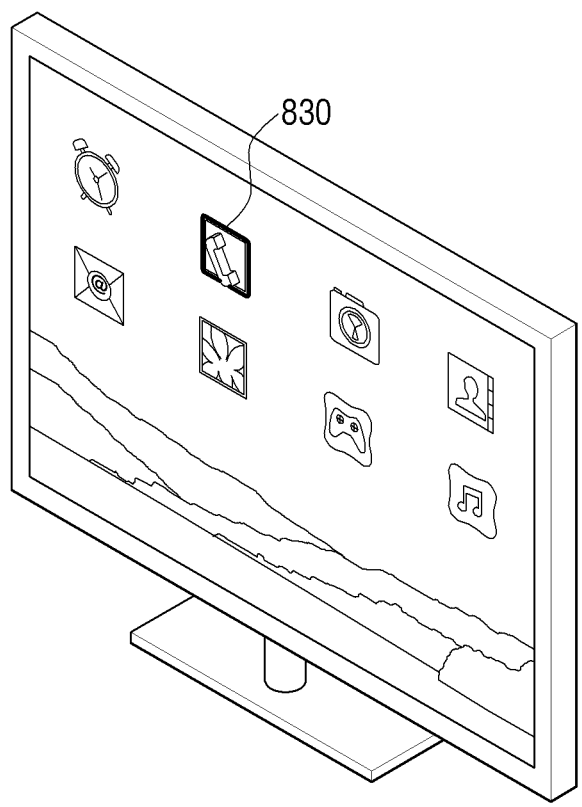

FIGS. 8A to 8C are diagrams for explanation of a depth correcting method according to another embodiment.

As illustrated in FIGS. 8A to 8C, even if a specific content region in an image is not an OSD region, a uniform depth value may be applied to the specific content region in the image. The specific content region in the image may be a region containing a graphic element such as a menu image, warning, time, channel number, a character or figure such as a broadcaster name, application, a volume control bar, a control reproduction bar, etc. In other words, a uniform depth value may be applied to a region containing specific content that is overlaid and displayed on the image.

For example, as illustrated in FIG. 8A, a preset uniform depth value may be applied to a region 810 for displaying a channel number. However, FIG. 8A illustrates a case in which an image is displayed in a 2D form and the region 810 for displaying channel number is displayed in a 3D form. However, exemplary embodiments are not limited. For example, when a channel number is displayed on the 3D image, a uniform depth value (e.g., a depth value 0) may be applied to a region for displaying the channel number to prevent distortion in the corresponding region.

As another example, as illustrated in FIG. 8B, a preset uniform depth value may be applied to a region 820 for displaying a volume control bar. Detailed description is omitted in FIG. 8B, since FIG. 8B has similar features as FIG. 8A.

As another example, as illustrated in FIG. 8C, when icons indicating plural respective applications are displayed, an icon 830 selected according to a user command may be displayed with preset depth values. For example, a depth value 0 or a preset value or less may be applied to a background image and icons, except for a selected icon 830, and a preset value or more may be applied to the selected icon 830 so as to differentiate the selected icon 830 and the other icons.

FIGS. 8A to 8C illustrate an example Thus, the embodiments may be applied to any content contained in an image displayed on a screen, e.g., content overlaid and displayed on the image.

Figure 9:
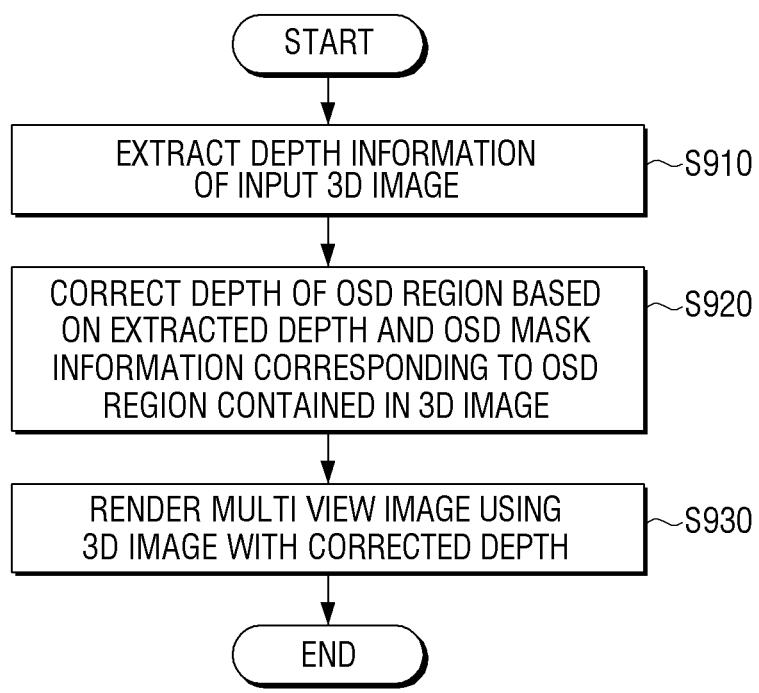
FIG. 9 is a flowchart for explanation of a method of controlling a multi view image processing apparatus according to an embodiment.

FIG. 9 is a flowchart for explanation of a method of controlling a multi view image processing apparatus according to an embodiment.

According to the method of controlling the multi view image processing apparatus of FIG. 9, depth information of an input 3D image is extracted (S910).

Then, a depth of an OSD region is corrected based on the extracted depth information and OSD mask information corresponding to an OSD region contained in the 3D image (S920).

Then, multi view images are rendered using the 3D image (i.e., the depth of which is corrected) (S930).

In operation S910 of extracting the depth information, a depth map may be generated based on the extracted depth information. In operation S920 of correcting the depth, a depth value of the OSD region may be corrected in the depth map.

In addition, in operation S920 of correcting the depth, the depth value of the OSD region may be corrected to a first depth value in the depth map.

In operation S920 of correcting the depth, a depth value of the remaining regions except for the OSD region may be corrected to a second depth value in the depth map.

In operation S920 of correcting the depth, a depth value of an entire region containing the OSD region may be corrected to 0 in the depth map.

The method of controlling the multi view image processing apparatus may include displaying a 3D image containing a plurality of OSD regions, receiving a user command for selecting at least one of the plural OSD regions, and differently correcting a depth of the OSD region selected according to the user command from depths of the remaining OSD regions.

In this case, during the depth correction, the depth of the selected OSD region may be corrected to a third depth value, and the depths of the remaining OSD regions may be corrected to 0.

According to the aforementioned embodiments, a non-glass type 3D system for preventing image distortion in an OSD region contained in a 3D image may be provided. In addition, according to the embodiments, the non-glass type 3D system may perform a partial 3D function.

The method of controlling the multi view image processing apparatus according to the aforementioned embodiments may be embodied as a program and provided to a display apparatus.

For example, a non-transitory computer readable medium for recording thereon a program according to the embodiments may be provided. The program performs extracting depth information of an input 3D image, correcting a depth of an OSD region contained in the 3D image based on the OSD mask information corresponding to the OSD region and the extracted depth information, and rendering multi view images using the 3D image (i.e., a depth of which is corrected).

The non-transitory computer readable medium is a medium that semi-permanently stores data and from which data is readable by a device, but not a medium that stores data for a short time, such as register, a cache, a memory, etc. The aforementioned various applications or programs may be stored in the non-transitory computer readable medium, for example, a compact disc (CD), a digital versatile disc (DVD), a hard disc, a blu-ray disc, a universal serial bus (USB), a memory card, a read only memory (ROM), etc., and may be provided.

Exemplary embodiments may also disclose that at least one of a depth extractor 110, a depth corrector 120, a rendering unit 130, a display unit 140, a user interface unit 150, and a controller 160 may include at least one processor, a hardware module, or a circuit for performing their respective functions.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims. Many alternatives, modifications, and variations will be apparent to those skilled in the art.

What is claimed is:

1. A multi view image processing apparatus comprising:
at least one processor which executes:
    a depth extractor which is configured to extract depth information of a three-dimensional (3D) image;
    a depth corrector which is configured to correct a depth value of an on screen display (OSD) region in the 3D image based on the extracted depth information and OSD mask information which corresponds to the OSD region in the 3D image;
    a rendering device which is configured to render multi view images using the 3D image with the corrected depth value; and
    a controller which is configured to control the depth corrector to correct a depth of at least one OSD region selected according to a user command differently from a depth of a remaining OSD region of a plurality of OSD regions in the 3D image.

2. The multi view image processing apparatus as claimed in claim 1, wherein the depth corrector is further configured to correct the depth value of the OSD region to a first depth value in the depth information.

3. The multi view image processing apparatus as claimed in claim 2, wherein the depth corrector is further configured to correct a plurality of depth values of remaining regions except for the OSD region to a second depth value in the depth information.

4. The multi view image processing apparatus as claimed in claim 1, wherein the depth corrector is further configured to correct the depth value of an entire region in the OSD region to 0 in the depth information.

5. The multi view image processing apparatus as claimed in claim 1, further comprising:
    a display device which is configured to display the 3D image comprising the plurality of OSD regions; and
    a user interface device which is configured to receive the user command.

6. The multi view image processing apparatus as claimed in claim 5, wherein the controller is further configured to control the depth corrector to correct the depth of the at least one selected OSD region to a preset third depth value, and to correct the plurality of depths of the remaining OSD regions except the at least one selected OSD region to 0.

7. A method of processing multi view images, the method comprising:
    extracting depth information of a three-dimensional (3D) image;
    correcting a depth value of an on screen display (OSD) region in the 3D image based on the extracted depth information and OSD mask information which corresponds to the OSD region in the 3D image using at least one processor; and
    rendering multi view images using the 3D image with the corrected depth value,
    wherein the correcting corrects a depth of at least one OSD region selected according to a user command differently from a depth of a remaining OSD region of a plurality of OSD regions in the 3D image.

8. The method as claimed in claim 7, wherein the correcting the depth value comprises correcting the depth value of the OSD region to a first depth value in the depth information.

9. The method as claimed in claim 8, wherein the correcting the depth value comprises correcting a plurality of depth values of remaining regions except for the OSD region to a second depth value in the depth information.

10. The method as claimed in claim 7, wherein the correcting the depth value comprises correcting the depth value of an entire region in the OSD region to 0 in the depth information.

11. The method as claimed in claim 7, further comprising:
    displaying the 3D image comprising the plurality of OSD regions;
    receiving the user command for selecting at least one of the plurality of OSD regions.

12. The method as claimed in claim 11, wherein the correcting the depth comprises correcting the depth of the at least one selected OSD region to a preset third depth value, and correcting the plurality of depths of the remaining OSD region except the at least one selected OSD region to 0.

* * * * *